US007967141B2

(12) United States Patent
Witczak

(10) Patent No.: US 7,967,141 B2
(45) Date of Patent: Jun. 28, 2011

(54) DEVICE FOR THE AUTOMATIC DETECTION OF THE MOVEMENT OF OBJECTS

(75) Inventor: John Witczak, Koekelberg (BE)

(73) Assignee: Beldico Integrated Solutions, S.A., Marache-En Famenne (BE)

( * ) Notice: Subject to any disclaimer, the term of this patent is extended or adjusted under 35 U.S.C. 154(b) by 896 days.

(21) Appl. No.: 11/938,831

(22) Filed: Nov. 13, 2007

(65) Prior Publication Data

US 2008/0159072 A1 Jul. 3, 2008

(30) Foreign Application Priority Data

Nov. 14, 2006 (EP) .................................... 06447119

(51) Int. Cl.
*G01N 35/10* (2006.01)

(52) U.S. Cl. ................ 206/459.1; 73/864.62; 73/862.53

(58) Field of Classification Search ............... 206/459.1; 73/862.541, 862.53

See application file for complete search history.

(56) References Cited

U.S. PATENT DOCUMENTS 4,603,791 A * 8/1986 Spierer et al. ............ 220/495.11
6,364,517 B1 4/2002 Yuyama et al.

FOREIGN PATENT DOCUMENTS

JP 10151179 6/1998
WO 2004014189 2/2004
WO WO 2004014189 A1 * 2/2004

* cited by examiner

*Primary Examiner* — Hezron Williams
*Assistant Examiner* — Paul West
(74) *Attorney, Agent, or Firm* — Cozen O'Connor

(57) ABSTRACT

The invention relates to a device for the automatic and instantaneous detection of movements of an object with respect to a housing containing or capable of containing this object chosen from the introductions of this object in this empty housing and the extractions of this object from its housing. The invention is characterized in that the device comprises a spring system (1) comprising two symmetrical blades (3, 3A) each formed by an upper wing (5, 5A) and of a lower wing (6, 6A) articulated between one another and forming at rest an obtuse angle, wherein these blades are positioned back to back at their articulation (4, 4A) in that the upper wings are configured to form a housing (7) for the object and in that the lower wings are connected to one another by a wire (8) forming a spring which cooperates with a push button (11) capable of moving perpendicularly to a pressure sensor (2) until it comes into contact with it or is freed from it.

10 Claims, 2 Drawing Sheets

DEVICE FOR THE AUTOMATIC DETECTION OF THE MOVEMENT OF OBJECTS

FIELD OF THE INVENTION

This invention relates, in general, to a device for the automatic detection of movements of objects.

More precisely, the invention relates to a device for the automatic and instantaneous detection of movements of an object with respect to a housing containing or capable of containing this object chosen from the introductions of this object in this empty housing and the extractions of this object from its housing.

BACKGROUND OF THE INVENTION

At present, the management and reliable and immediate monitoring of objects regardless of their nature may represent a challenge given the diversity of the numerous objects that are part of everyday life. It is common for firms or companies to be confronted with real problems of managing their stocks that may be composed of a multitude of objects of different forms and dimensions, whether for example they are stocks of tooling equipment, stocks of spare parts for different appliances or other.

By way of example, at present, in hospital environments, there are no efficient systems which permit the complete management of medication, as such a system is not on sale. For this reason, such management is carried out at least partially in a manual fashion.

As the nursing staff may have access to all types of medication so that they may be administered, it is virtually impossible to identify accurately the nature and the quantity of each medication administered to a patient so that they be invoiced to the latter. This situation is even more true and worrying in emergency situations, as in ordinary situations, it may be imagined that the nursing staff has the possibility of recording on a sheet the medication administered to a patient which constitutes, in all cases, a loss of time.

It therefore appears most important to be able to dispose of a system for managing the medication in hospital environments that is either entirely automated thus excluding any manual interventions, especially for the invoicing of these medication to the patients. Ideally, this system would provide the automation not only to monitor the stock of medication in the local pharmacies but also the recording of the withdrawal of medication from these pharmacies destined for a patient.

Consequently, this system must be able to reflect any movements capable of accompanying a medication which is to say it being taken out of a stock or on the contrary being introduced into a stock.

SUMMARY OF THE INVENTION

This invention overcomes the disadvantages of the state of the art by proposing a device capable of detecting automatically and instantaneously of any movement affecting an object in relation to this device, wherein the latter is simple, rational and flexible to use in particular for the management and automatic monitoring of medication in hospital environments for the invoicing of the medication actually administered to a patient.

To achieve this objective, the device of the type previously indicated is characterised in that it comprises a spring system comprising two symmetrical blades each formed of an upper wing and a lower wing articulated between one another and forming at rest an obtuse angle, wherein these blades are positioned back to back at their articulation, in that the upper wings are configured to form a housing for the object and in that the lower wings are connected to one another by a wire forming a spring which cooperates with a push button capable of moving perpendicularly to a pressure sensor until it comes into contact with it or is freed from it.

The spring system which constitutes, essentially the housing accommodating or designed to accommodate the object, permits the force required for the insertion of this object into this housing to be transformed into a force perpendicular to a pressure sensor and, at the same time, into a pressure on it. This pressure is furthermore independent of the dimensions of the object housed or to be housed of its diameter, if it relates to a cylindrical object.

This spring system is advantageously attached to a support, usually a support block in which it is located to be attached preferably so that it may be removed.

Generally, this block is formed by four longitudinal walls joined by their longitudinal edges thus defining a volume with no transversal walls at the base and top. Furthermore, the opposite upper edges of two of these transversal walls are configured so that they participate in the attachment of the spring system inside this volume. This attachment is advantageously by means of the upper wings of this system and more particularly their upper edges so that the distance between these upper wings remains constant whether there is an object present or not in the housing they form.

Usually, these wings are attached to the walls in question by conventional means, for example by tenons. These tenons, extending from the two upper edges of the upper wings, cooperate with orifices located in two opposite walls of the support block or, preferably, with slots made in the edges of these two opposite walls.

Furthermore, in the volume defined by the joined longitudinal walls is located a tubular portion parallel to these walls and featuring at least one longitudinal groove and generally two grooves. This tubular portion is attached to the walls by means of rigid arms so that these grooves may cooperate by sliding with the longitudinal protrusions on the wall on the outside of the push button.

Furthermore, the support of the spring system, advantageously the support block, is itself attached to a support plate of the pressure sensor so that it may be positioned in the extension of the displacement of the push button.

This attachment, which is preferably removable, may be made using any appropriate known means and especially using hooks on the lower edges of the support block, wherein the hooks cooperate, by insertion, with the orifices in the support plate of the pressure sensor.

This pressure sensor advantageously corresponds to a device that converts pressure, weight and force into an electrical resistance that can be measured. The value of this resistance, as well as its sensitivity, may be adapted, according to the requirements, by modifying the topology of the sensor and by selecting the materials suited to the specific application envisaged. Moreover, this sensor may be used in extreme conditions or specific circumstances, for example in the presence of a pressure and/or a low temperature or on the contrary high temperature or mounted on difficult surfaces.

Usually, this pressure sensor is managed by an electronic board which carries out the intermittent or preferably permanent, scanning. This scanning thus permits the nature of any movements that may be transmitted to the object to be detected, which is to say the introduction in this empty housing, translating the presence of this object in this housing, detected by the contact with this pressure sensor and the extraction from this housing, translating the absence of an object in this housing, detected by the liberation of a contact with this pressure sensor. This detection thus generates an item of movement information that may be managed using known methods, for example that may be transmitted depending on requirements to a central computer processing unit to be used by software.

The automatic detection device previously described may be used to detect the movements of an object compatible with the dimensions of the housing designed to accommodate it. Furthermore, this object will have a solid consistency and be sufficiently rigid to cause, when it is introduced into this housing or removed from it, respectively a pressure on the upper wings of the spring system or a release of this pressure.

Different objects which satisfy these criteria may be envisaged, in particular, and non restrictively, bottle, flasks, tubes, cans or similar, which are made for example from glass, metal, rigid plastics, rigid cardboard or similar and containing liquids such as drinks, cosmetic products, cleaning agents, cleaning products, phytosanitary or other products.

In one specific and preferred embodiment, the objects designed to manage, according to the method and device of the invention, are represented by medication, which is to say pharmaceutical and/or veterinary products, possibly packaged or even by medical or surgical devices or appliances if required that are packaged.

The medication in question may be presented in all pharmaceutical forms—solid, flexible, semi-solid, liquid or even in the form of pressurised pharmaceutical preparations.

By way of non restrictive examples, these various pharmaceutical forms may be chosen from sachets, tablets, soft capsules, coated pills, capsules, chewing gums, granules, pills, oral powders, powders to be injected, suppositories, pessaries, transdermal devices, cataplasms, creams, plasters, gels, pastes, ointments, eye lotions, drinkable emulsions, otic drops, lotions, foams, shampoos, syrups, solution to be drunk or injected, drinkable suspensions, oral liquids, preparations for inhalation with nebulisers, pressurised or powder inhalers.

Given their consistency, dimensions or weight that are not suited for use according to the invention, most of the galenical forms mentioned above will be placed in a container that satisfies the solidity and rigidity criteria mentioned previously, for example a tube, that is preferably cylindrical.

BRIEF DESCRIPTION OF THE DRAWINGS

The invention will be better understood and other objectives, characteristics and advantages of it will become clearer in the following detailed description made in reference to the appended drawings provided solely by way of example illustrating different embodiments of the invention and in which.

DETAILED DESCRIPTION OF THE INVENTION

Figure 1:
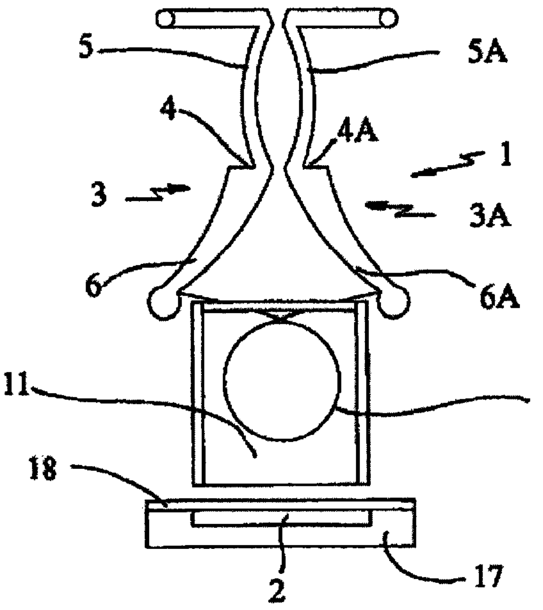
FIG. 1 is a diagrammatical representation of a front sectional view A-A of a spring system and of a support plate of a pressure sensor.
Figure 3:
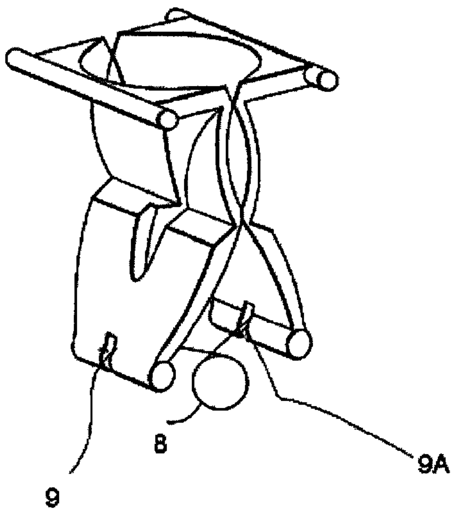
FIGS. 2 and 3 are perspective representations, respectively complete and partial, of a spring system.
Figure 2:
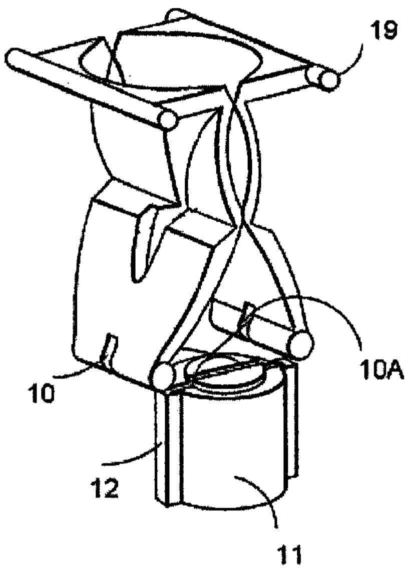

As represented in FIG. 1, the device for the automatic, electronic and instantaneous detection of an object with respect to a housing containing or designed to contain it, comprises a spring system 1, that may also be seen in FIG. 2 or partially in FIG. 3, as well as a pressure sensor 2.

This spring system, of which one portion is equivalent to a housing designed to accommodate an object for example a medication, comprises two blades 3, 3A generally moulded from a plastic material, preferably polyoxymethylene (POM). These blades, respectively articulated in 4, 4A, form, at rest, an obtuse angle, wherein each of them comprises an upper wing respectively 5, 5A and a lower wing respectively 6, 6A. As may also be seen in FIGS. 2, 3 and 5, the walls of the wings 5, 5A located opposite one another, each have a curve such that the union of these two curves forms a volume that is substantially conical equivalent to the housing 7 capable of accommodating an object such as a medication in single units. Generally, the dimensions of this housing are sufficient to accommodate this medication or a packaging of this medication with a width for example ranging from 9 mm to 25 mm.

Furthermore, the lower wings 6, 6A are connected to one another by a wire 8 forming a spring whose ends 9, 9A are curved into hooks cooperating with the edges of these lower wings by means of orifices 10, 10A. This set-up is completed by a push button 11 for example made of ABS. This button, which is especially visible in FIG. 2, is attached to the spring 8 and has longitudinal protrusions 12 that are diametrically opposite one another.

Figure 4:
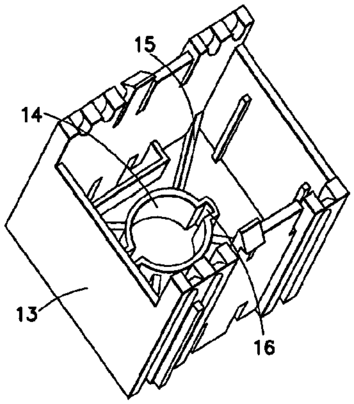
FIG. 4 is a perspective representation of a support block.
Figure 5:
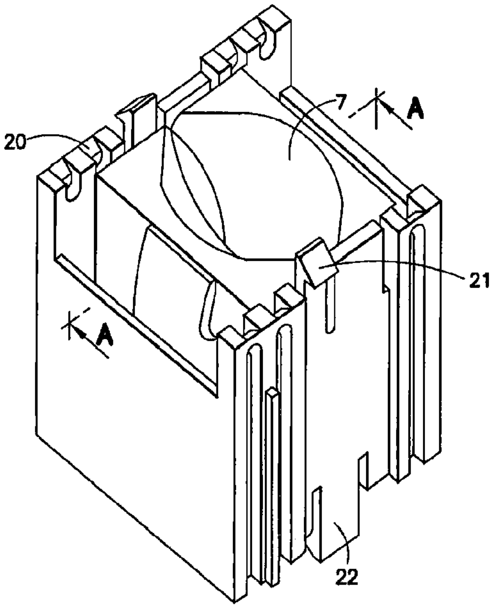
FIG. 5 is a perspective representation of the block of FIG. 4 supporting a spring system.

The spring system thus elaborated is attached to a support block shown in FIG. 4 to form the assembly of FIG. 5. This block, defined by the walls 13, parallel two by two, is generally obtained from a plastic material capable of providing very good rigidity for the set-up, for example the acrylonitrile butadine styrene (ABS).

In reference again to FIG. 4, it may be observed that the support block is completed by a tubular portion 14, centred in the volume inside this block and attached by rigid arms 15 to the walls in question. This tubular portion has grooves 16 positioned longitudinally and which cooperate by sliding with the protrusions 12 of the push button.

As shown diagrammatically in FIG. 1, the spring system overhangs a plate 17, for example made of stainless steel and with a thickness of approximately 2 mm. This plate provides support to a pressure sensor 2 positioned in the extension of the tubular portion 14. This pressure sensor is fixed, for example by gluing to the support plate, which is covered entirely by a film 18 approximately 1 mm thick of a protective material, for example silicone.

The resistance value of this sensor, during contact with a object, for example a medication, is around 1500Ω and more than 10 000Ω in the absence of a contact, which permits faultless detection of this object.

By referring especially to FIG. 2, it may also be observed that the edges of the upper wings of the spring system extend, on either side, in four tenons 19 which are capable of fitting into the slots 20 made on the upper edges of two parallel walls of the support block.

As also shown in FIG. 4, the upper and lower edges of the support block moreover have hooks respectively 21 and 22: the hooks 21 are provided to attach the identification plates of the object bearing its description or a related colour code, wherein the hooks 22 are designed to fit into the slots (not shown) in the plate 17.

The pressure sensor 2 is, dependent on an electronic board (not shown) capable of carrying out the scanning. This board is made up of input/output ports managed by microcontroller and a communication port. In fact, this board carries out the scan in less than 0.5 seconds and with low electrical consumption (less than 50 mA), which permits a response to be obtained virtually instantaneously when extracting an object, for example a medication from its housing or when such an object is re-introduced into a housing until it creates a contact with this sensor. Furthermore, a storage memory allows all of the contacts or liberations of contacts with the pressure sensor to be conserved, even in the event of a fault with the computer processing unit connected to it or a breakdown in communication with it.

In the light of the above, it may be understood that the introduction of an object into the housing 7, for example a vial of a solution that may be injected, causes the separation of the blades 5 and 5A attached to the support block by means of tenons 19 and slots 20. This separation creates a vertical force on the two ends of the spring 8 at the hooks 9 and 9A. Simultaneously, the spring passes on this force by a vertical force on the push button 11 on which it is fitted. This pressure, for example around 15 Newtons, is always constant and maximum given that this push button is retained by a stop point to avoid too excessive a pressure being exerted on the pressure sensor and thus risking it being weakened. The push button is then moved in the direction of the pressure sensor 2 until it comes into contact with it, which causes the emission of an electrical pulse translating this introduction movement and, consequently, the presence of this object in the housing.

On the contrary, the withdrawal of an object from its housing 7 causes the blades 3 and 3A, attached to the support block, to move towards one another, due to the liberation of the tension of the spring 8 and simultaneously that of the contact of the push button 11 with the pressure sensor 2. This push button moves away from this sensor causing the emission of an electrical pulse translating this withdrawal movement and, consequently, the absence of this object in the housing.

These electrical pulses, which constitute items of information on the movements of these objects, may be transmitted, to suit requirements, via an electronic board and for example a Wi-Fi network, to a computer processing unit for use by suitable software.

The preceding specific embodiments are illustrative of the practice of the invention. It is to be understood, however, that other expedients known to those skilled in the art or disclosed herein, may be employed without departing from the spirit of the invention or the scope of the appended claims.

The invention claimed is:

1. A device for the automatic and instantaneous detection of movements of an object with respect to a housing containing or capable of containing this object chosen from the introductions of this object into this housing and the extractions of this object from its housing, which comprises a spring system (1) comprising two symmetrical blades (3, 3A) each formed by an upper wing (5, 5A) and a lower wing (6, 6A) articulated between one another and forming at rest an obtuse angle with each other, wherein these blades are positioned back to back at their articulation (4, 4A), in that the upper wings are configured to form a housing (7) for the object and in that the lower wings are connected to one another by a wire (8) forming a spring which cooperates with a push button (11), the push button (11) being capable of moving perpendicularly to a pressure sensor (2) until said push button (11) comes into contact with said pressure sensor or is freed from said pressure sensor.

2. A device according to claim 1, wherein the spring system is attached to a support block.

3. A device according to claim 2, wherein the support block is formed by four longitudinal walls (13) joined by their longitudinal edges defining a volume in which is located a tubular portion (14) parallel to these walls and featuring at least one longitudinal groove (16), wherein this tubular portion is attached to the walls by means of rigid arms (15).

4. A device according to claim 3, wherein each longitudinal groove cooperates by sliding with a longitudinal protrusion (12) on the wall on the outside of the push button.

5. A device according to claim 2, wherein the upper wings of the spring system have tenons (19) which cooperate with orifices located in two opposite walls of the support block or with slots (20) made in the edges of these two opposite walls.

6. A device according to claim 2, wherein the lower edges of the support block have hooks (22) designed to be inserted into slots made in a plate (17) supporting the pressure sensor.

7. A device according to claim 1, wherein the pressure sensor is managed by an electronic board that carries out a permanent scanning.

8. A device according claim 1, wherein the introduction of a object in the housing (7) causes the separation of the blades (3, 3A) attached to the support block and the development of a force on the ends of the spring (8) which passes this on to the push button (11) inducing the displacement of said push button (11) in the direction of the pressure sensor (2) until it comes into contact with it, which causes the emission of an electrical pulse.

9. A device according to claim 8, wherein the electrical pulse is transmitted to a computer processing unit.

10. A device according to claim 1, wherein the withdrawal of an object from the housing (7) causes the blades (3, 3A) attached to the support block to move towards one another inducing the interruption of the contact of the push button (11) with the pressure sensor (2) and its separation from this sensor, which causes the emission of an electrical pulse.

* * * * *